US012808428B2

(12) United States Patent
Tavares et al.

(10) Patent No.: US 12,808,428 B2
(45) Date of Patent: Nov. 24, 2026

(54) TRANSMISSION BELT FOR A ROLLER CONVEYOR HAVING ROLLERS WITH CONCAVE GROOVES, AND ASSOCIATED CONVEYOR

(71) Applicant: HUTCHINSON, Paris (FR)

(72) Inventors: Julien Tavares, Truyes (FR); Olivier Hiesse, Saint Avertin (FR); Hervé Varin, Savonnieres (FR)

(73) Assignee: HUTCHINSON, Paris (FR)

( * ) Notice: Subject to any disclaimer, the term of this patent is extended or adjusted under 35 U.S.C. 154(b) by 136 days.

(21) Appl. No.: 18/865,558

(22) PCT Filed: May 12, 2023

(86) PCT No.: PCT/EP2023/062724

§ 371 (c)(1),
(2) Date: Nov. 13, 2024

(87) PCT Pub. No.: WO2023/222528

PCT Pub. Date: Nov. 23, 2023

(65) Prior Publication Data

US 2025/0314284 A1 Oct. 9, 2025

(30) Foreign Application Priority Data

May 16, 2022 (FR) ....................................... 2204634

(51) Int. Cl.
*F16G 1/08* (2006.01)
*B65G 13/07* (2006.01)
*B65G 39/02* (2006.01)

(52) U.S. Cl.
CPC ............... *F16G 1/08* (2013.01); *B65G 13/07* (2013.01); *B65G 39/02* (2013.01)

(58) Field of Classification Search
CPC ............ B65G 13/07; B65G 39/02; F16G 1/08
(Continued)

(56) References Cited

U.S. PATENT DOCUMENTS 6,689,005 B2 * 2/2004 Hasaka ..................... F16G 1/08 474/267
6,866,922 B2 * 3/2005 Takehara .................. F16G 1/08 474/271
(Continued)

FOREIGN PATENT DOCUMENTS

DE 102004026840 A1 * 12/2004 .............. C08L 23/16
EP 0708269 B1 * 1/1999 ............... F16G 1/08
(Continued)

OTHER PUBLICATIONS

International Search Report and Written Opinion for PCT Application No. PCT/EP2023/062724, dated Aug. 4, 2023, 12 pages.

*Primary Examiner* — Douglas A Hess
(74) *Attorney, Agent, or Firm* — Dickinson Wright PLLC

(57) ABSTRACT

A transmission belt for a roller conveyor having rollers having concave grooves and made of steel or plastic is disclosed. The belt comprises an elastomer-based body comprising a dorsal portion and a ventral portion formed by a single toothing, an outer surface of which has a convex shape configured to engage with a concave groove of a roller; a set of tension cords embedded in the body between the dorsal portion and the ventral portion of the body; and a coating arranged on the outer surface of the toothing and defining, with the convex shape of the outer surface of the toothing, a coefficient of friction with the concave groove of a roller that is non-zero and less than or equal to 0.8.

20 Claims, 8 Drawing Sheets

(58) Field of Classification Search
USPC .......................................................... 198/790
See application file for complete search history.

(56) References Cited

U.S. PATENT DOCUMENTS

| | | | | |
|---|---|---|---|---|
| 7,887,448 | B2 * | 2/2011 | Hineno | F16G 5/06 474/263 |
| 8,152,666 | B2 * | 4/2012 | Varin | F16G 5/20 156/138 |
| 8,262,522 | B2 * | 9/2012 | Dieudonne | F16G 5/06 474/264 |
| 9,933,041 | B2 * | 4/2018 | South | F16G 5/16 |
| 10,436,285 | B2 * | 10/2019 | Takehara | F16G 1/08 |
| 10,514,083 | B2 * | 12/2019 | Gregg | B29D 29/08 |
| 10,591,020 | B2 * | 3/2020 | Kageyama | B32B 3/30 |
| 2002/0003997 | A1 | 1/2002 | Orinski et al. | |
| 2002/0039947 | A1 | 4/2002 | Hasaka et al. | |
| 2009/0107809 | A1 * | 4/2009 | Wagner | |
| 2014/0323257 | A1 | 10/2014 | Gibson | |
| 2026/0029036 | A1 * | 1/2026 | Di Meco et al. | |

FOREIGN PATENT DOCUMENTS

| | | | | |
|---|---|---|---|---|
| EP | 3045771 | A1 | 7/2016 | |
| GB | 697901 | | 9/1953 | |
| JP | S5337266 | A | 4/1978 | |
| JP | 2007284200 | A | 11/2007 | |
| WO | WO-2023090423 | A1 * | 5/2023 | F16G 1/08 |
| WO | WO-2025262052 | A1 * | 12/2025 | F16G 1/10 |

* cited by examiner

[Fig. 1]
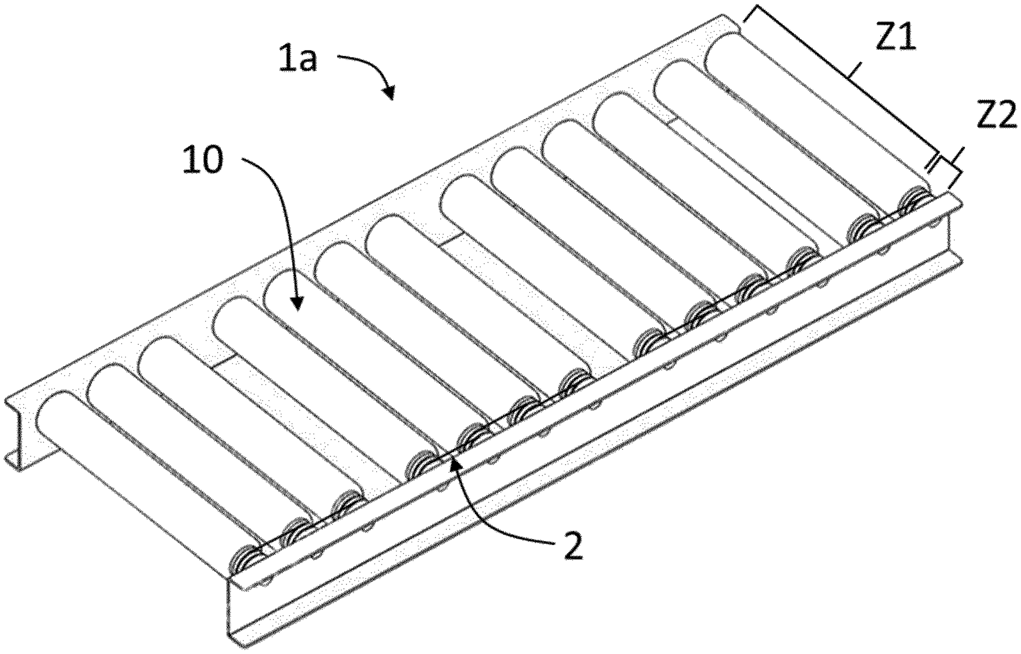
[Fig. 2]
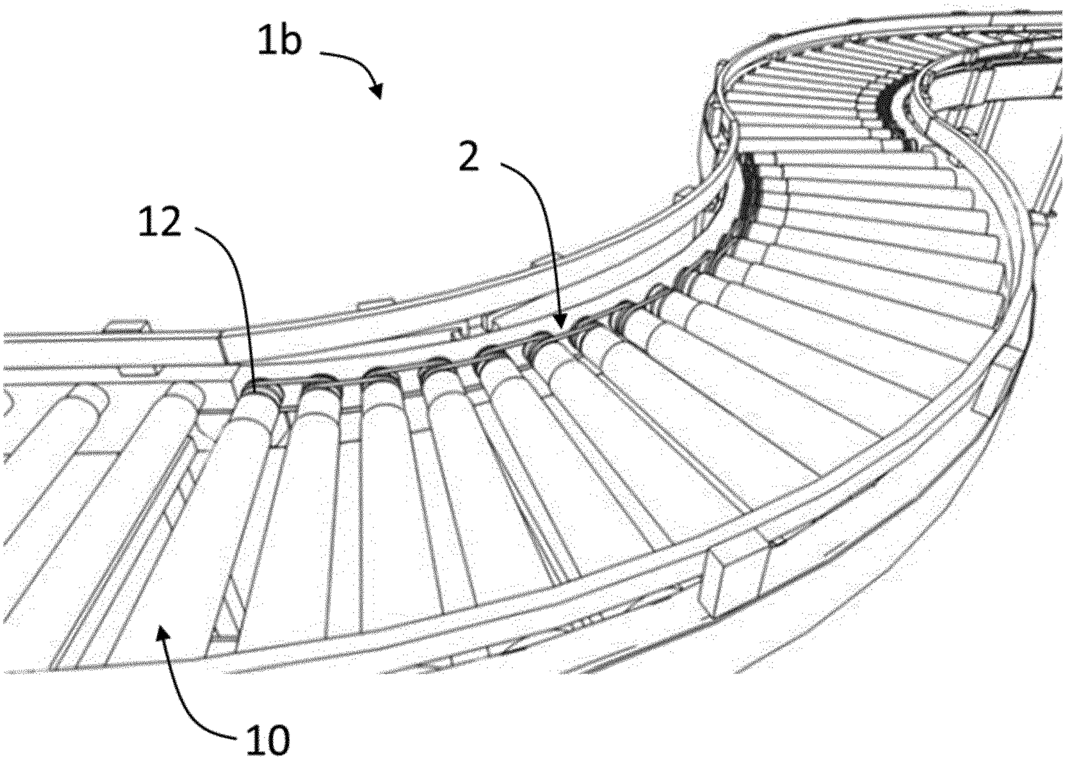

[Fig. 3]
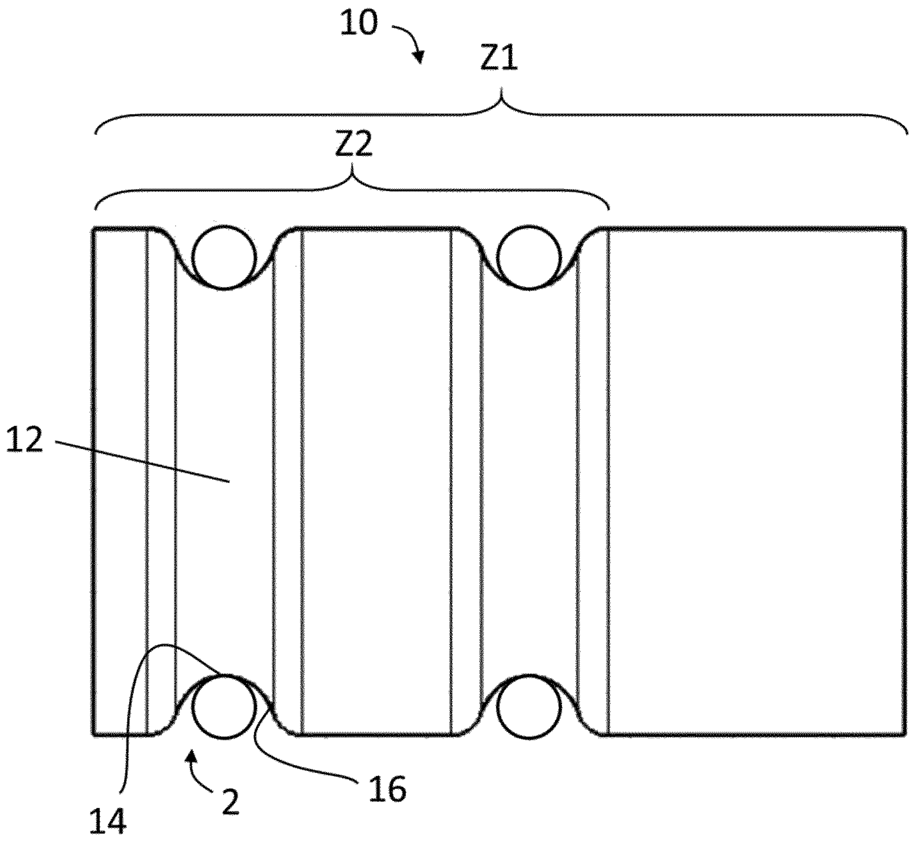
[Fig. 4]
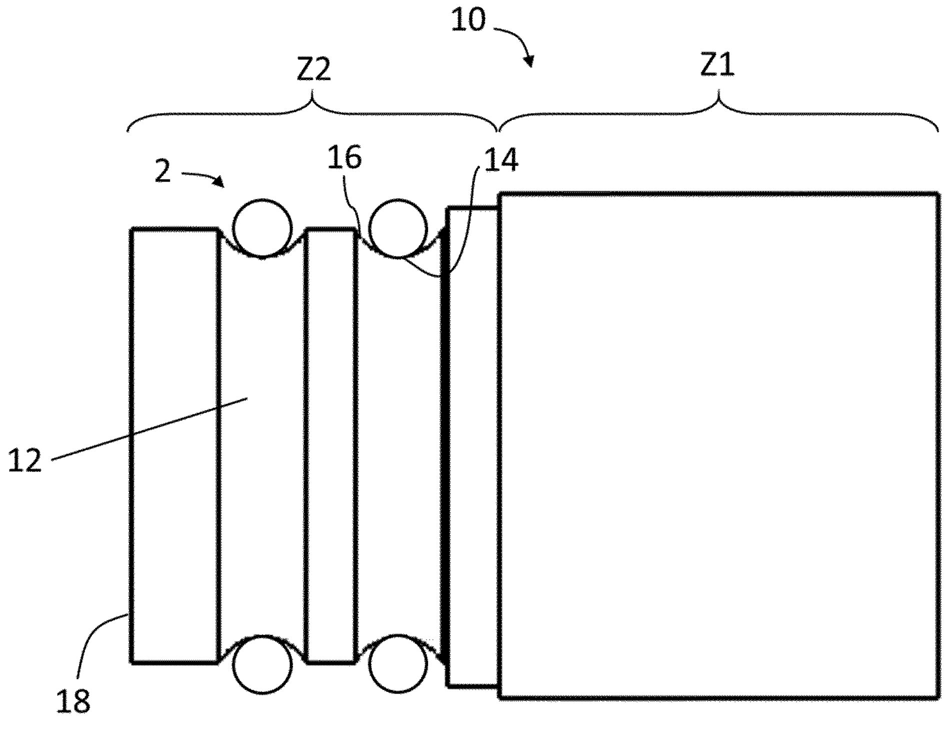

[Fig. 5]
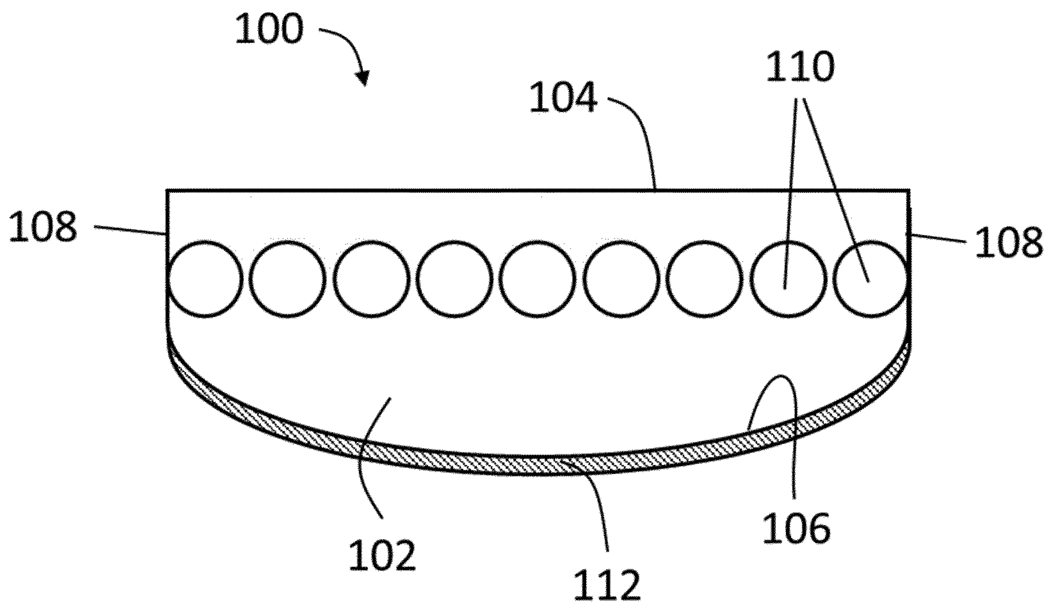
[Fig. 6]
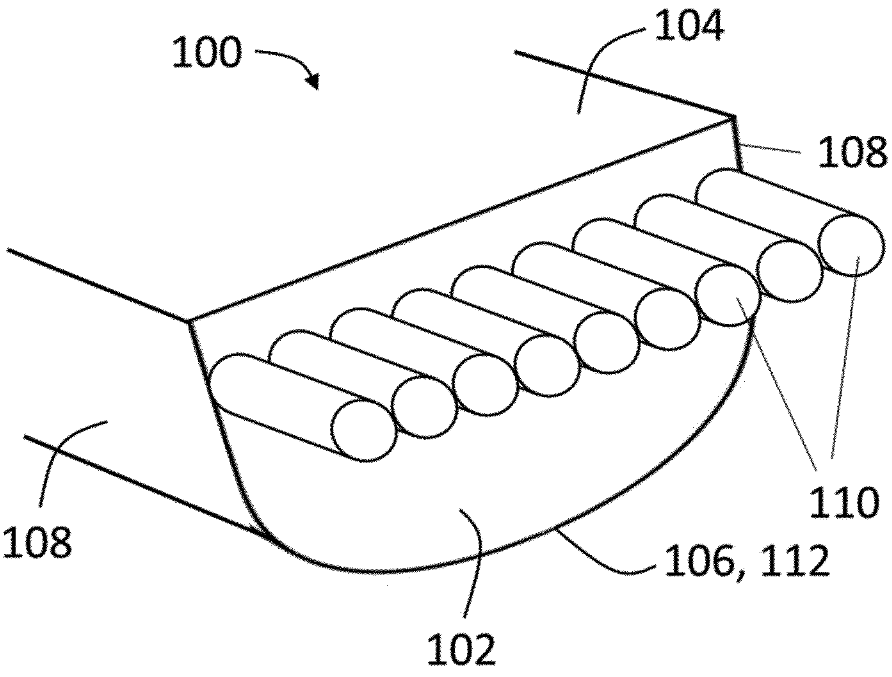

[Fig. 7]
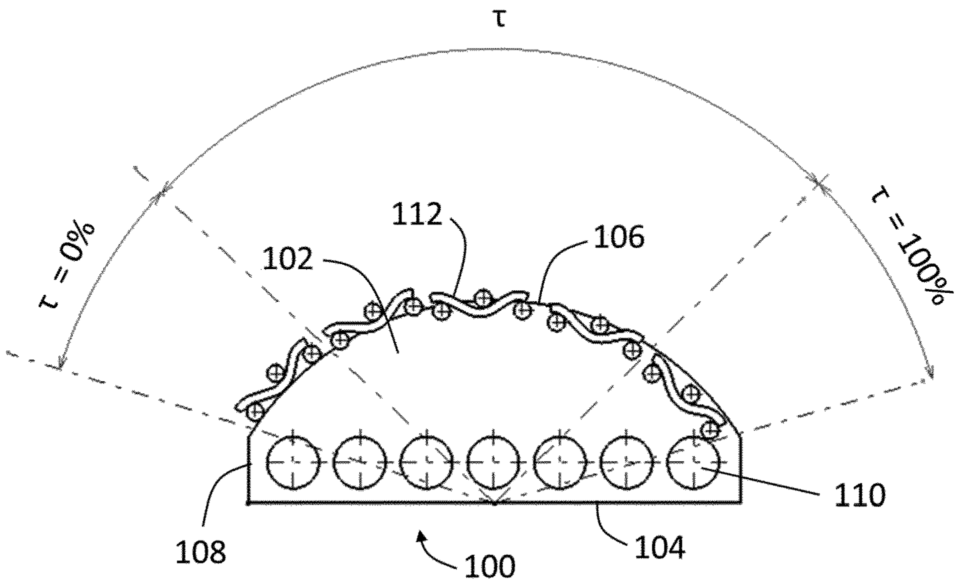
[Fig. 8]
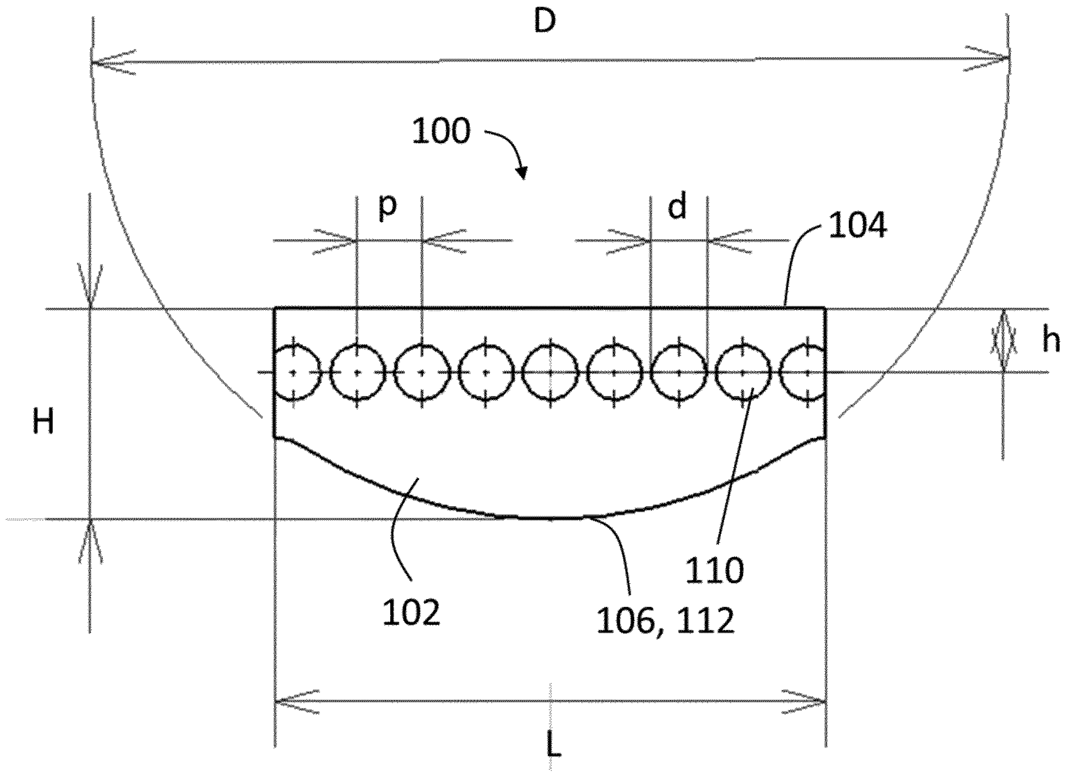

[Fig. 9]
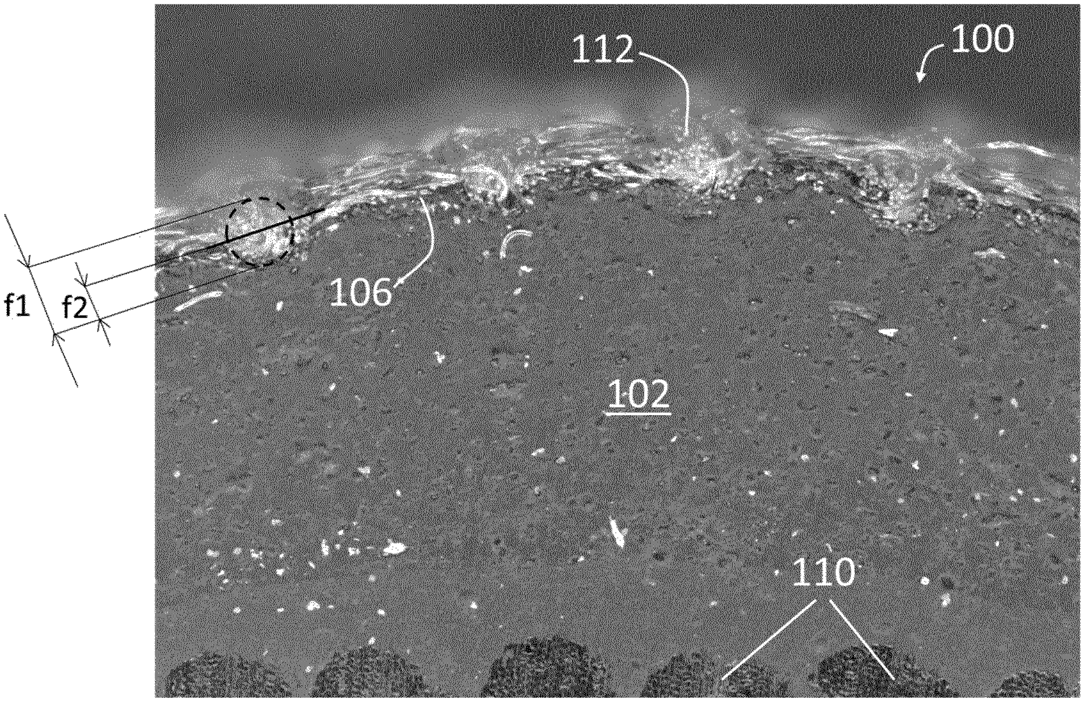
[Fig. 10]
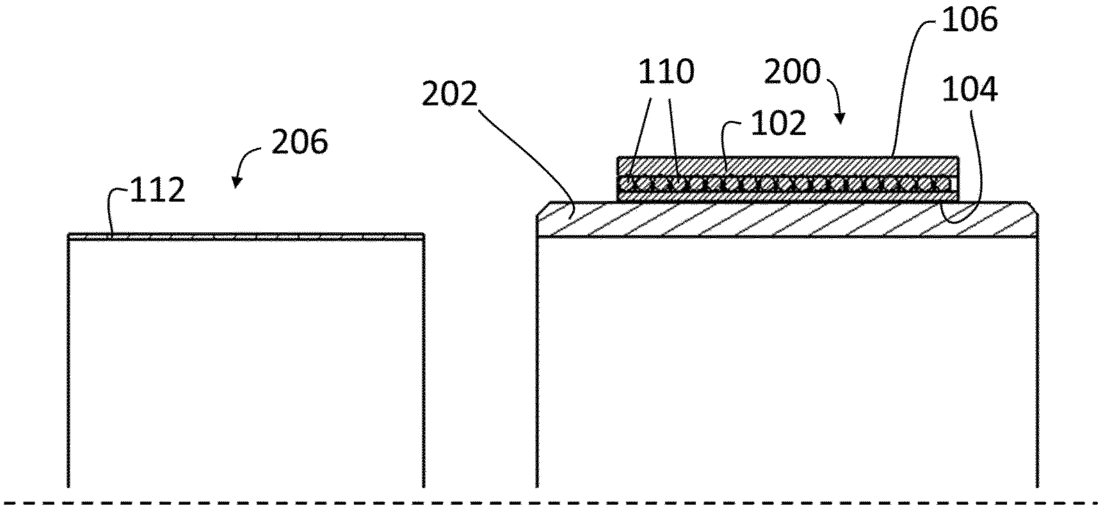

[Fig. 11]
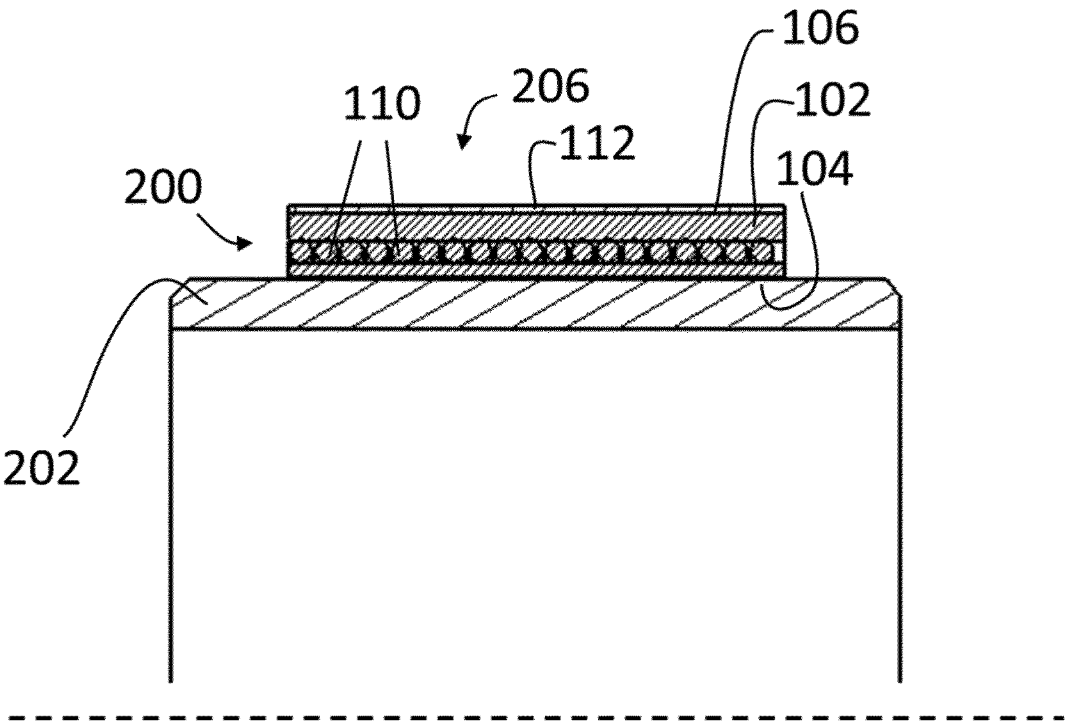
[Fig. 12]
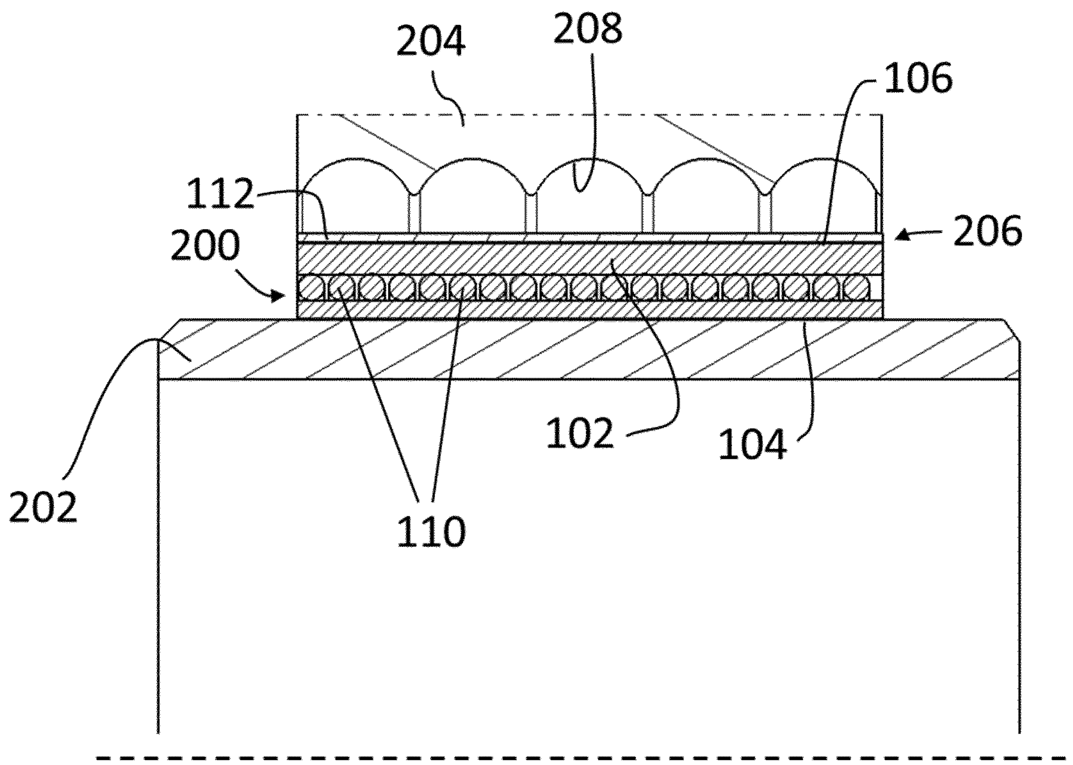

[Fig. 13]
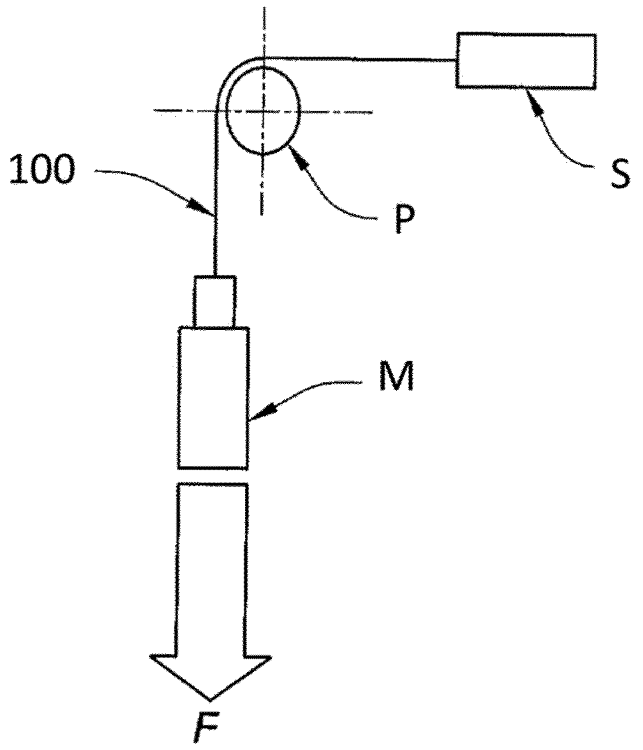
[Fig. 14]
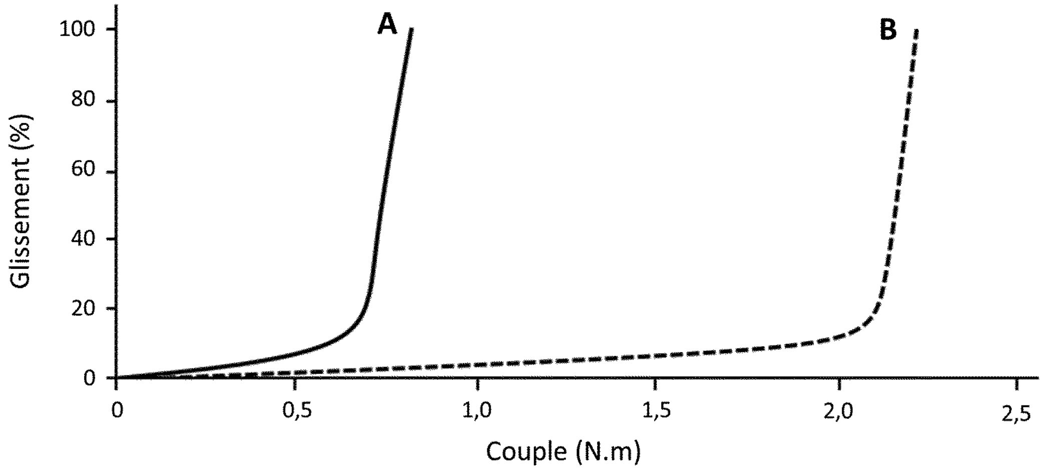

[Fig. 15]
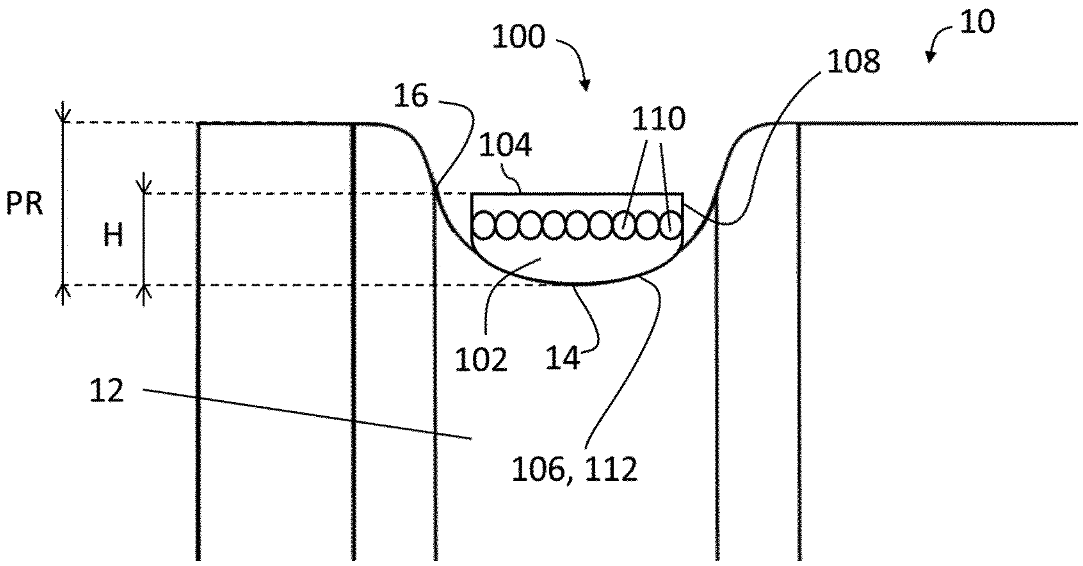
[Fig. 16]
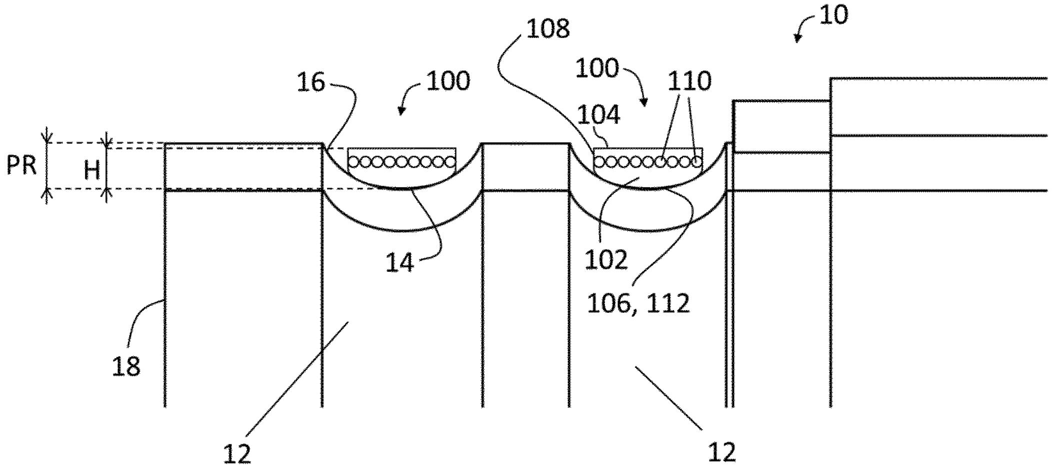

TRANSMISSION BELT FOR A ROLLER CONVEYOR HAVING ROLLERS WITH CONCAVE GROOVES, AND ASSOCIATED CONVEYOR

CROSS-REFERENCE TO RELATED APPLICATION(S)

This present application is a national stage application of International Patent Application No. PCT/EP2023/062724, filed May 12, 2023, which claims priority to French Patent Application No. 2204634, filed May 16, 2022, the disclosures of which are hereby incorporated by reference in their entireties.

TECHNICAL FIELD

This disclosure relates to a transmission belt for a roller conveyor having rollers with concave grooves. The disclosure also concerns a concave-groove roller conveyor equipped with such belts.

BACKGROUND

The roller conveyors are widely used in the logistics and goods flow sector for routing and sorting objects of all kinds, particularly packages. Generally speaking, these conveyors comprise a plurality of rollers driven in rotation by a drive element by means of transmission elements. There are different types of rollers and just as many transmission elements, each with its own specific requirements. In particular, the roller conveyors having rollers with concave grooves, usually round, are very common. They are shown, for example, in FIGS. 1 to 4.

FIGS. 1 and 2 show conventional configurations of round-grooved roller conveyors, i.e. a straight conveyor 1*a* as shown in FIG. 1 and a curved part of a conveyor 1*b* as shown in FIG. 2.

Typically, each of the rollers 10 of the conveyor 1*a*, 1*b* comprises, at least at one of its longitudinal ends, grooves 12 with round groove bottoms 14. Round belts 2, i.e. with a disc-shaped cross-section, are engaged in these grooves 12 to drive the rollers 10. These belts, typically made of polyurethane, are inexpensive and easy to fit in the grooves.

In operation, a driving roller drives in rotation the adjacent rollers 10, known as slave rollers, by means of belts 2. This driving roller is similar to slave rollers, except that it is equipped with a motor that allows it to turn on itself. A driving roller then drives a first slave roller in rotation, by means of a first belt 2, a first roller which may itself drive a second slave roller in rotation by means of a second belt, etc.

To maximize the torque transmission between two rollers, the belt 2 must rest on the bottom 14 of the groove 12 with as large a contact surface as possible, while avoiding contact with the side 16 of the groove 12 as far as possible. Contact with the side of the groove has a number of harmful consequences. Firstly, the belt is subjected to two speeds that are too different because there are two contact surfaces between the belt and the groove that are located at relatively different distances from the axis of rotation of the roller. This increases the belt deformation and wear. Secondly, it makes it easier to turn the belt. These harmful situations are particularly common in the curved part of a conveyor, as the curvature encourages the belt to come into contact with one side of the groove.

The document US-A1-2009/107809 describes a typical example of a roller conveyor.

Next, we need to distinguish between different types of roller conveyor.

FIG. 3 shows a first type of roller 10, made of steel, which comprises grooves 12 formed directly into the roller 10 at one of its ends. These grooves may, for example, be pressed into the roller. In this case, there is an area Z1 for the passage of the packages, which extends over the entire length of the roller 10, thus encompassing a transmission area Z2 where the grooves 12 and the round belts 2 are located. Although this configuration allows the widest possible passage area Z1, it may prove problematic if a package comes into contact with one of the belts 2. In the event of an impact between the belt 2 and the package, the belt 2 may disengage from the groove 12 in the roller 10, which could cause the conveyor to stop.

To prevent this from happening, the diameter of the section of the round belt 2 is chosen to be strictly less than the depth of the groove 12. For example, for a 10 mm (millimeter) deep groove, the diameter of the belt cross-section is 6 mm.

However, this limits the contact surface between the belt 2 and the bottom 14 of the groove 12, and therefore the torque that may be transmitted by the belt between two rollers.

Alternatively, there are rollers with a drive head 18 mounted at one end of the roller 10, as shown in FIG. 4. The drive head 18, typically made of plastic, offers the advantage of having a transmission area Z2 closer to the end of the roller 10 and the side profile of conveyor 1*a*, 1*b*. In this way, it is possible to separate the area Z2 of the belts and the area Z1 where the packages to be transported pass over the rollers, thus limiting or even preventing the packages from coming into contact with the belts 2. However, for the same conveyor width, the rollers in FIG. 4 will be able to drive smaller packages than the rollers in FIG. 3.

In practice, the current round belts have a relatively poor torque transmission and a poor service lifetime, particularly in the curved parts of a conveyor where they are likely to turn over more easily, resulting in accelerated wear or even breakage, particularly at the level of the belt weld.

The documents US-A1-2002/03997, US-A1-2014/323257, JP-A-S53-37266, EP-A1-3045771 or GB-A-697901 illustrate other types of belts that may be used in roller grooves.

It is also an objective of the disclosure to propose a transmission belt for a roller conveyor with concave grooves that does not have at least one of the aforementioned disadvantages.

Another aim of the disclosure is to provide a transmission belt for a roller conveyor having rollers with concave grooves offering improved performance in terms of the torque that may be transmitted between two rollers.

Another aim of the disclosure is to propose a transmission belt for a roller conveyor having rollers with concave grooves that also limits the risk of the belt turning over, particularly in a curved part of a conveyor.

SUMMARY

A transmission belt for a roller conveyor having rollers with concave grooves made of steel or plastic is therefore proposed, the belt comprising:

- an elastomer-based body comprising a dorsal portion and a ventral portion which is formed by a single toothing, an outer surface of which has a convex shape which is configured to cooperate with a concave groove of a roller;

a set of tension cords embedded in the body between the dorsal portion and the ventral portion of the body; and a coating arranged at the outer surface of the toothing defining, with the shape of the outer surface of the toothing, a coefficient of friction with the concave groove of a roller that is non-zero and less than or equal to 0.8.

The disclosure thus ensures an improvement in the torque transmissible by the belt and its stability. In fact, in use, the contact surface between the belt and the bottom of the groove of the roller is high thanks to the convex shape of the toothing of the belt, which adapt to the concave shape of the groove. In addition, the combination of this convex shape of the toothing with the coating arranged on the outer surface of the toothing means that the coefficient of friction of the belt in the groove may be set to a controlled value. With a controlled coefficient of friction and the presence of cords that improve the tensile modulus of the belt, the transmissible torque may be kept under control. This also reduces the risk of the belt overturning when it runs up the side of the groove, particularly in a curved part of a conveyor.

The belt, according to the disclosure, may comprise one or more of the characteristics below, taken in isolation from each other or in combination with each other:

the coefficient of friction is greater than or equal to 0.3;

the set of tension cord defines a tensile modulus of the belt of between 500 N and 1500 N, advantageously between 800 N and 1500 N, and preferably between 800 N and 1200 N;

the cords of the set of cords are made of a polyamide- or polyester-based material;

the coating, partially embedded in the toothing, is chosen from a knitted fabric, a woven fabric, a non-woven fabric or a set of fibers;

the coating is made of a material chosen from polyamide, polyester, cellulose fibers, for example cotton, a mixture of cellulose fibers and polyurethane or a combination of these;

the body is made of a material selected from ethylene-propylene-diene monomer, ethylene-propylene copolymer, polybutadiene, polyurethane or natural rubber;

the body is made of a material chosen from ethylene-propylene-diene monomer or ethylene-propylene copolymer, and the coating is a film of thermoplastic material which is at least partly cross-linked, comprising at least 30% polyethylene, the thermoplastic film covering the outer surface of the toothing;

the film comprises particles and/or fibers of graphite, molybdenum disulphide and/or polytetrafluoroethylene.

The disclosure also relates to a conveyor comprising a plurality of rollers with concave grooves made of steel or plastic rollers, wherein the rollers are connected together in pairs by a belt as described above, so that the coating of the belt is in contact with the concave grooves of the rollers.

The conveyor, according to the disclosure, may comprise one or more of the characteristics below, taken in isolation from each other or in combination with each other:

the belt has a height that is strictly less than the depth of the groove that receives it;

the concave grooves of the rollers are made of a plastic material chosen from polyamide, polypropylene or a composite material based on fibers embedded in a thermoplastic or thermosetting resin;

the belt is installed between the rollers with a laying tension of between 60 N/strand and 100 N/strand.

BRIEF DESCRIPTION OF THE DRAWINGS

The disclosure will be better understood with the aid of the following description, given only by way of example and made with reference to the attached drawings wherein:

FIG. 1 shows a schematic view of a straight roller conveyor according to the prior art, FIG. 2 shows a schematic view of a curved roller conveyor according to the prior art, FIG. 3 shows a schematic view in longitudinal cross-section of a concave groove roller with a conventional transmission belt according to the prior art, FIG. 4 shows a schematic view in longitudinal cross-section of another shape of concave groove roller with a conventional transmission belt according to the prior art, FIG. 5 shows a schematic cross-sectional view of the transmission belt for a concave-groove roller conveyor according to the disclosure, FIG. 6 shows a schematic perspective view and partial cross-section of the belt shown in FIG. 5, FIG. 7 shows a schematic cross-sectional view of the belt according to the disclosure, illustrating in particular different penetration rates of the coating at the level of the outer surface of the toothing of the body of the belt, FIG. 8 shows a schematic cross-sectional view of one embodiment of the belt according to the disclosure, defining in particular the dimensions of the belt, FIG. 9 shows a cross-sectional photographic view of the belt in FIG. 8, FIG. 10 shows a schematic view in longitudinal cross-section of a mandrel, around which belt materials are placed, and a knitted sleeve as used in the manufacture of a belt according to the example of embodiment, FIG. 11 shows a schematic view in longitudinal cross-section of the knitted sleeve placed on the belt materials, themselves arranged on the mandrel in FIG. 10, FIG. 12 shows a schematic view in longitudinal cross-section of the object in FIG. 11 inserted into a mold, FIG. 13 is a schematic view of an experimental installation used to measure the coefficient of friction of a belt with a pulley, FIG. 14 is a graph comparing the evolution of the slip as a function of the torque transmitted for a conventional belt known from the prior art and the belt in the example embodiment, FIG. 15 shows a schematic view in longitudinal cross-section of the belt according to the disclosure, mounted on a roller with concave grooves as shown in FIG. 3, and FIG. 16 shows a schematic view in longitudinal cross-section of the belt according to the disclosure, mounted on a roller with concave grooves as shown in FIG. 4.

DETAILED DESCRIPTION

In the following, reference is made to a transmission belt for a roller conveyor having rollers with concave grooves, such as those described above to illustrate the prior art and shown in FIGS. 1 to 4.

FIG. 5 and FIG. 6 show, respectively, a cross-sectional view and a perspective view and partial cross-section of a transmission belt 100 for a conveyor 1*a*, 1*b* with rollers 10 with concave grooves 12. By “concave grooves” we mean any groove with a generally concave cross-section, for example a round groove (i.e. with a groove bottom in the shape of an arc of a circle, or a groove with an elliptical or ovoid bottom).

The belt 100 comprises an elastomer-based body 102, a set of tension cords 110 and a coating 112.

The elastomer-based body 102 comprises a dorsal portion 104.

The elastomer-based body 102 also comprises a ventral portion 106, formed of a single toothing, an outer, convex surface of which is configured to cooperate with a concave groove 12 of the roller conveyor 1*a*, 1*b*, 10. The outer, convex surface of the toothing may, for example, be arcuate, elliptical or ovoid, depending in particular on the shape of the concavity forming the groove. Advantageously, the outer surface of the toothing of the ventral portion 106 forms an arc of a circle when the groove of the roller is round.

In addition, this convex outer surface helps to define the coefficient of friction (COF) between the belt 100 and the groove 12 of the roller 10 wherein the belt 100 is configured to be installed. In practice, the higher the coefficient of friction, the greater the torque that may be transmitted. However, the higher the coefficient of friction, the greater the risk of the belt 100 overturning, particularly in a curved part of a conveyor. On the contrary, the lower the coefficient of friction, the less torque may be transmitted, thus limiting the torque that may be transmitted from one roller to another.

Controlling this parameter will be discussed below.

In addition, the dorsal portion 104 and the ventral portion 106 of the body 102 may, but need not, be connected by lateral portions 108.

The belt 100 also comprises a set of tension cords 110. The cords 110 are embedded in the body 102 between the dorsal portion 104 and the ventral portion 106 of the body 102. The cords 110 increase the tensile modulus of the belt 100. They therefore extend along the length of the belt and are arranged next to each other across the width of the body 102. A cord 110 of the set of cords may in particular be made of a material chosen from polyamide (PA) or polyester. For the application in question, they therefore allow a greater torque transmission while maintaining a very limited elongation of the belt 100.

The construction of each cord 110, the number of cords 110 arranged across the width of the belt 100 and the choice of the material making them up is variable and depends on the tensile modulus required for the belt 100 to ensure a torque transmission while limiting the elongation of the belt 100. The general effect of the presence of such cords 110 is to allow a higher torque transmission, particularly compared with known round belts (generally made of polyurethane) which have no cords for this type of conveying application.

Advantageously, the tensile modulus of the belt is chosen between 500 N (Newton) and 1500 N. Even more advantageously, the tensile modulus is between 800 N and 1500 N, and preferably between 800 N and 1200 N.

The belt 100 also comprises a coating 112 arranged on the outer surface of the toothing. This coating 112 contributes, together with the shape of the toothing, to defining the coefficient of friction (COF) between the belt 100 and the steel roller 10 or the plastic drive head 18 of the roller 10.

The coating 112 may typically be chosen from a knitted fabric, a woven fabric, a non-woven fabric or an assembly of fibers.

In this case, the elastomer-based body 102 of the belt may be made of a material selected from, but not limited to, ethylene-propylene-diene monomer (EPDM), ethylene-propylene copolymer (EPM), polybutadiene (BR), polyurethane (PU) or natural rubber.

In this case, the coating 112 may be made of a material typically chosen from polyamide, polyester, cellulose fibers, in particular cotton, a mixture of cellulose fibers and polyurethane, in particular a mixture of cotton and polyurethane, or a combination of these.

In particular, the coating 112 may be a polyamide knit or a cotton fabric mixed with polyurethane.

In this case too, a part of the coating 112 is embedded in the toothing.

In this case, the coefficient of friction is linked to various parameters, such as the type of coating 112, for example knitted or woven fabric, the nature of its material, for example polyamide, its grammage or even its penetration rate $\tau$ into the ventral portion 106 at the level of the outer surface of the toothing. This also depends on the nature of the elastomer and its properties.

The coefficient of friction between an elastomer and a steel or plastic is particularly high, typically greater than 1.5. The parameters mentioned above for characterizing the coating 112 allow, depending on the choices made, to reduce the coefficient of friction (compared with the same surface without coating 112) and therefore to control it. Given the number of parameters, there are many ways of defining the coefficient of friction. From a practical point of view, we may first choose the type of coating 112 (knitted fabric, woven fabric, etc.) then the material of which it is made (polyamide, polyester, etc.), its grammage (the higher the grammage, the more the coating 112 covers the outer surface and vice versa) and finally its rate of penetration into the toothing. This penetration rate $\tau$ is defined as the fraction of the total thickness of the coating 112 that is embedded in the toothing of the elastomer-based body 102. Locally, this penetration rate $\tau$ may vary from one point of the belt 100 to another, so an average penetration rate $\tau$ is considered over the entire belt 100. In practice, the penetration rate $\tau$ will be non-zero and strictly less than 100%, its exact value depending on the other parameters. The choice of these parameters will also depend on the nature of the elastomer used.

A concrete example of embodiment will be given below.

FIG. 7 is simply intended to illustrate this concept of the penetration rate $\tau$ of the coating 112 into the toothing from the outer surface of these toothing, the coating 112 considered here being a knitted fabric. Thus, on the left of this FIG. 7, with a penetration rate $\tau$ of zero (0%), no fraction of the knitted fabric 112 penetrates the body 102. In contrast, on the right-hand side of FIG. 7, with a penetration rate $\tau$ of 100%, the knitted fabric 112 is completely embedded in the body 102 (right). Finally, in the middle of FIG. 7, we have shown various situations representative of a penetration rate $\tau$ at nine that is non-zero and strictly less than 100%.

Alternatively, the coating 112 may be a film of partially cross-linked thermoplastic material, comprising at least 30% polyethylene (PE), this film covering the outer surface of the toothing. It is understood that the thermoplastic film does not penetrate the toothing.

In such a case, the body 102 of the belt 100 is advantageously based on an ethylene alpha olefin elastomer, in particular an EPDM or an EPM.

The thermoplastic film may comprise between 30% and 90% polyethylene, advantageously between 50% and 90% polyethylene, and preferably between 75% and 90% polyethylene.

The polyethylene in the film co-cross-links with the elastomer, for example EPDM or EPM, thanks to the presence of peroxide or another cross-linking agent. This helps the film adhere to the elastomer.

The thermoplastic film may consist of a blend of polyolefins containing a homo- or copolymer comprising ethylene. Ethylene copolymers comprise ethylene/alpha-olefin copolymers, ethylene/unsaturated ester copolymers, ethylene/acrylate/acrylic acid copolymers, ethylene/methacrylic acid copolymers and polyethylene-ethyleneoctene copolymers. The thermoplastic film may also be based on low-density polyethylene.

The thermoplastic film may have a thickness of between 10 μm (micrometer) and 500 μm, and more particularly between 50 μm and 200 μm.

Advantageously, the thermoplastic film also comprises particles and/or fibers of graphite, molybdenum disulphide and/or polytetrafluoroethylene (PTFE). Among other things, this influences the coefficient of friction.

The particles may have a particle size of between 15 μm and 200 μm, advantageously between 30 μm and 100 μm and more particularly between 30 μm and 90 μm.

The type of film described above for the coating 112 is already known per se to the person skilled in the art and its manufacture therefore poses no difficulty. However, it is not used for the application under consideration here.

Example of Embodiment of a Belt According to the Disclosure

In what follows, reference is made to FIG. 5 and FIG. 8, which show an example of embodiment of how the belt 100 may be used.

The elastomer-based body 102 is made of peroxide-cured ethylene propylene diene monomer (EPDM) with a hardness of between 75 and 85 Shore A due to the presence of peroxide in the EPDM, which influences the coefficient of friction. This EPDM is chosen with a viscosity of 100 Mooney points, ML (1+4) at 100 °C. This viscosity is determined in accordance with the ISO 289-1 standard, which specifies the test temperature (100 °C), the sample preheating time before starting shearing (1 min) and the shearing time (4 min).

In this example of embodiment, the belt 100 has a geometry defined as follows and illustrated in FIG. 8. The body 102 has a thickness, or height, H of 2.3 mm and a width L of 6 mm. The single convex toothing of the body 102 has the shape of an arc of a circle with a diameter D of 10 mm.

The set of cords 110 embedded in the body 102 comprises nine cords 110. The cords 110 have a diameter d of 0.6 mm and their centers are separated laterally by a pitch p of 0.7 mm. The center of each cord 110 is also located at a distance h of 0.7 mm from the dorsal part 104 of the belt 100.

Each cord 110 is made of polyamide (PA), and in particular 940×1×2 polyamide 6-6 (PA66), i.e. each thread has a titer of 940 dtex (decitex), i.e. $940\times10^{-7}$ kg/m (kilogram per meter), and each thread is first twisted individually before being twisted with the other. Each cord 110 also has a Young's modulus of 400 MPa (Megapascal), or 400 $N/mm^2$ (Newton per square millimeter).

The tensile modulus of the belt may thus be calculated and expressed as the Young's modulus of the cord 110 multiplied by the cross-sectional area of the cord 110. In this example of embodiment, the belt has nine cords 110 with a diameter d of 0.6 mm for each cord 110, giving a total cross-sectional area of 2.54 $mm^2$. Thus, the tensile modulus of the belt is approximately 1000 N. In other words, the set of cords 110 defines the tensile modulus of the belt 100.

The coating 112 is a polyamide (PA) jersey knit, in particular polyamide 6-6 (PA66), with a tubular finish and a grammage of 60 $g/m^2$ (grams per square meter). FIG. 9 shows a photograph of a cross-section of the example of embodiment of the belt 100. In FIG. 9, the penetration rate $\tau$ may be estimated qualitatively by measuring the fraction f2 of the knitted fabric in the toothing in relation to the thickness f1 of the knitted fabric. In this example, the penetration rate $\tau$ to new of the knitted fabric into the toothing at the level of their outer surface is of the order of 50%.

As mentioned above, the grammage chosen in this example of embodiment is 60 $g/m^2$. However, the inventors believe that a lower basis grammage may be used to achieve similar properties. This grammage may be at least 20 $g/m^2$, preferably at least 30 $g/m^2$, and more preferably at least 40 $g/m^2$.

Reference is now made to FIGS. 10 to 12 illustrating steps in the manufacture of a belt 100 according to the aforementioned embodiment. FIGS. 10 to 12 show half-views in longitudinal cross-section.

The method for manufacturing a belt is well known in the prior art. Typically, this involves placing belt materials forming an assembly 200 around a mandrel 202 and then placing this mandrel 202 with the assembly 200 in a mold 204, this mold 204 then being pressed against the assembly 200 which takes the desired shape. The assembly 200 may then be cut to a desired width to obtain a belt 100.

FIG. 10 represents the present case, where the belt materials forming the assembly 200 comprise the dorsal part 104 (in the crude state) of the body 102 of the belt, the cords 110 and the ventral portion (in the crude state) of the body 102 of the belt. In FIG. 10, on the right, the assembly 200 is already positioned on the mandrel 202. On the left of FIG. 10 is a sleeve 206 of knitted fabric 112.

The sleeve 206 of knitted fabric 112 is then elongated, by approximately 20%, in the direction defined by the circumference of the mandrel 202, to be placed around the mandrel 202 so as to cover the outer surface of the assembly 200, as shown in FIG. 11.

FIG. 12 shows the mandrel 202, with the assembly 200 and the knitted sleeve 206 112 placed around it, once it has been introduced into a mold 204 comprising at least one concave pattern on its inner wall 208.

The mold 204 is pressed, with a pressure of 7 bars, against the assembly 200 and the sleeve 206 of knitted fabric 112 so that the inner wall 208 of the mold 204 with at least one concave pattern forms a corresponding convex pattern on the outer surface of the assembly 200 with the knitted fabric 112. The pressure of the mold 204 also allows the knitted fabric 112 to penetrate the outer surface of the toothing thus formed. At the same time, the mandrel 202 is heated to 170 °C to vulcanize the dorsal 104 and ventral 106 portions configured to form the vulcanized elastomer body 102. It is understood that the concave pattern of the mold 204 is printed on the assembly 200 with the knitted fabric 112.

Various tests were performed to characterize a belt 100 produced in this way. In some cases, the results obtained are compared with the characteristics of a prior art belt, i.e. a polyurethane (PU) based round belt, without cords or any other form of reinforcement, with a circular cross-section, a diameter of 6 mm, and a tensile modulus of 250 N.

Test: Determination of the Coefficient of Friction of the Belt of the Example of Embodiment on a Steel Pulley The coefficient of friction of the belt was determined using the experimental set-up shown in FIG. 12. For this test, the belt 100 in the form of a single strand (not welded to be closed on itself) is arranged on a pulley P. The pulley P is chosen to be representative of a steel roller with a round groove. One end of the belt strand 100 is mounted on a mass M generating a force F of 1.75 daN (deca Newton), the other end of the belt 100 being mounted on a frame, at which the tension T exerted on the strand of belt 100 is measured by a suitable measuring means S, such as a force sensor. The pulley P is rotated at a speed of 43 rpm for the two minutes of the test. The force is then measured at the end of these two minutes, on the pulley that is still rotating.

The coefficient of friction (COF) is then determined by the following relationship:

$$COF = \left(\frac{1}{\alpha}\right) \times \ln\left(\frac{T}{F}\right) \quad \text{[Math 1]}$$

where:

α is the angle of wrap of the belt around the pulley, namely here $\alpha=\pi/2$ expressed in radians (rad), T is the tension measured at one end of the belt, expressed in Newton (N), F is the force generated by the mass at the other end of the belt, expressed in Newtons (weight).

The coefficient of friction of the strand of belt 100 tested in this way was evaluated at 0.3.

After specifying all the characteristics of the belt 100 according to the example of embodiment and in particular the tensile modulus and the coefficient of friction on a steel pulley, representative of a round-grooved roller of a conveyor, tests were performed to verify the performance of the belt 100.

Result 1: Determining the Maximum Transmissible Torque

Tests to determine the maximum transmissible torque of the belt 100 thus produced were carried out on a test bench comprising two pulleys, one driving and one receiving, simulating two rollers of a conveyor. The driving pulley rotates at 305 rpm. A resistive torque is applied progressively in steps of 0.1 N.m (Newton meters) to the driven pulley so that the belt slides over the pulley. This pair defines the abscissa of the graph shown in FIG. 14 and described below.

When the belt 2, 100 is engaged in the groove 12, it has a certain adhesion with the bottom 14 of the groove 12, which allows the roller 10 to be driven. This adhesion will resist a tangential force on the surface of the belt 2, 100 up to a certain torque limit. If this limit is exceeded, there is slippage and therefore no more drive. In practical terms, this means that the belt 2, 100 slips in the groove 12.

The overall slip p may then be calculated according to the relationship $$\rho = \frac{(R_m \times \omega_m - R_r \times \omega_r)}{R_m \times \omega_m} \times 100 \quad \text{[Math 2]}$$

where:

ρ is the overall slip, expressed as a percentage (%), $R_m$ and $R_r$ are respectively the radius of the driving pulley and the radius of the driven pulley, each expressed in meters (m), and $\omega_m$ and $\omega_r$ are respectively the angular velocity of the driving pulley and the angular velocity of the driven pulley, each expressed in radians per second (rad/s).

So, when the maximum torque is reached, i.e. when the driven pulley blocks and its speed $\omega_r$ becomes zero, the slip is 100%.

We now turn to FIG. 14, which shows a comparison of the evolution of slip as a function of torque, for a conventional round belt 2 (curve A) and for a belt 100 according to the example of embodiment of the disclosure (curve B).

The curve A shown in FIG. 14 shows that for a conventional round belt 2 the slip is 100% for a maximum torque close to 0.7 N.m. The curve B, on the other hand, shows that for a belt 100 according to the example of embodiment, the slip is 100% for a maximum torque close to 2.1 N.m. In other words, the belt 100 has approximately three times the torque transmission capacity of a conventional belt 2. In practical terms, this means that a driving roller on a conveyor 1*a*, 1*b* equipped with the belt 100 in this example of embodiment may drive three times as many slave rollers 10 as with a conventional round belt 2.

Result 2: Endurance Test

Endurance tests on the belt 100 according to the example of embodiment were carried out on a test bench simulating a curved conveyor. This test bench comprises a driving roller and a slave roller arranged next to the driving roller, but whose longitudinal axis is not oriented parallel to the longitudinal axis of the driving roller, and more precisely arranged with an angle of misalignment of 6° with respect to the longitudinal axis of the driving roller. Laying the belt on the rollers according to the example of embodiment required an elongation of 8% compared to its length at rest, which translates into a laying tension of 80 N/strand (given its tensile modulus of 1000 N). By “strand” we mean the portion of belt 100 configured to extend, in use, between two rollers 10. The driving roller rotates at 305 rpm. The tests were carried out at room temperature.

To assess the belt’s behavior over time, the test consists of repeating a certain number of on/off cycles 1 s/1 s (second). This means that the driving roller turns for one second, then stops for one second, then starts again for one second, and so on until it reaches 500,000 cycles. The acceleration/deceleration associated with the start/stop cycles combined with the inertia of the slave roller generate a resistive torque.

It has been observed that the belt according to the disclosure passes this endurance test with a limited trace of wear. This means that the coefficient of friction has remained stable over time.

A similar test was carried out on a conventional round belt as described above. It has been observed that the round belt comes out more worn, which makes it more fragile.

This last test marks the end of the description and results associated with the production example of embodiment.

It should also be noted that other tests have been performed on belts similar to the one shown in the example of embodiment, with only the rate of penetration of the knitted fabric into the toothing being changed, in order to modify the coefficient of friction. We were able to determine that the coefficient of friction should not exceed the approximate value of 0.8, because above this value there was a risk of the belt turning over in the groove of a roller on a curved conveyor.

Consequently, the coefficient of friction of the belt 100 with the groove 12 of the roller 10 must be less than or equal to 0.8.

Advantageously, this coefficient of friction of the belt 100 is non-zero and less than 0.8, and at the same time the tensile modulus of the belt 100 is between 500 N and 1500 N, advantageously between 800 N and 1500 N, and preferably between 800 N and 1200 N.

Advantageously still, the coefficient of friction of the belt 100 with the groove 12 of the roller 10 is between 0.3 and 0.8, and combined with a tensile modulus of the belt 100 of between 500 N and 1500 N, advantageously between 800 N and 1500 N, and preferably between 800 N and 1200 N.

The disclosure also relates to a concave-groove roller conveyor similar to conveyors 1*a*, 1*b* shown in FIGS. 1 and 2.

This conveyor 1*a*, 1*b* comprises a plurality of rollers 10 with concave grooves 12 which are connected together in pairs by a belt 100 as described above. Advantageously, the belt 100 is installed between the rollers 10 with a laying tension of between 60 N/strand and 100 N/strand.

FIGS. 15 and 16 show the belt 100 according to the disclosure engaged respectively in a concave groove 12, for example made of steel, formed in a roller 10 and in a concave groove 12 belonging to a drive head 18, for example made of plastic such as polyamide (PA), polypropylene (PP) or a composite material based on fibers embedded in a thermoplastic or thermosetting resin, attached to a roller 10. In both cases, the convex toothing of the ventral portion 106 of the body 102 of the belt 100 cooperate with the concave groove 12, and in particular with the bottom 14 of groove 12. It is understood that the radius of curvature of the bottom 14 of the groove 12 is substantially equal to the radius of curvature of the toothing of the ventral portion 106 of the body 102. This maximizes the contact surface between the belt 100 and the bottom 14 of the groove 12.

FIGS. 15 and 16 also show that the belt 100 is mounted in the grooves 12 of the rollers 10 of the conveyor 1*a*, 1*b* in such a way that each belt 100 has a height H strictly less than a depth PR of the groove 12 receiving it.

As described above, the transmission capacity of the belt 100 according to the disclosure is at least twice that of a conventional round belt 2. Consequently, the conveyor according to the disclosure may comprise twice as many slave rollers 10 as a conveyor equipped with conventional round belts 2. This means that if, for example, a conventional conveyor is dimensioned to comprise a plurality of driving rollers separated from each other by at least 3 to 5 slave rollers, then the conveyor according to the disclosure may comprise a plurality of driving rollers separated from each other by at least 6 to 10 slave rollers. Of course, this could be more if the conventional conveyor is sized as such.

In the light of what has been described above, it is clear that the belt according to the disclosure allows an improvement in the torque transmissible by the belt and its stability. In fact, in use, the contact surface between the belt and the bottom of the groove of the roller is high thanks to the convex shape of the toothing of the belt, which adapt to the concave shape of the groove. In addition, the combination of this convex shape of the toothing with the coating arranged on the outer surface of the toothing means that the coefficient of friction of the belt in the groove may be set to a controlled value. With a controlled coefficient of friction and the presence of cords improving the tensile modulus of the belt, the transmissible torque may be controlled as well as the levels of deformation of the belt in the event of contact with one side of the groove, which limits the risks of the belt overturning, particularly in a curved part of a conveyor.

Another advantage is that the belt is more durable over time. In fact, thanks to the stable friction coefficient over time, the belt wears less quickly, which improves its service lifetime.

Another advantage is that it reduces the cost of producing a conveyor. In fact, thanks to the improvement in the torque transmissible by the belt according to the disclosure, more slave rollers can be slaved to a driving roller in a conveyor. As a result, the number of driving rollers may be reduced, saving on infrastructure and energy.

What is claimed is:

1. A transmission belt for a roller conveyor having rollers with concave grooves made of steel or plastic, the transmission belt comprising:

an elastomer-based body comprising a dorsal portion and a ventral portion which is formed by a single toothing, an outer surface of which has a convex shape which is configured to engage with a bottom of a concave groove of a roller;

a set of tension cords embedded in the elastomer-based body between the dorsal portion and the ventral portion of the elastomer-based body; and a coating arranged on the outer surface of the toothing defining, with the convex shape of the outer surface of the toothing, a coefficient of friction with the concave groove of a roller that is non-zero and less than or equal to 0.8.

2. The transmission belt according to claim 1, wherein the coefficient of friction is greater than or equal to 0.3.

3. The transmission belt according to claim 2, wherein the set of tension cords defines a tensile modulus of the transmission belt of between 500 N and 1500 N.

4. The transmission belt according to claim 2, wherein the cords of the set of cords are made of a polyamide- or polyester-based material.

5. The transmission belt according to claim 2, wherein the coating, partially embedded in the toothing, is chosen from a knitted fabric, a woven fabric, a non-woven fabric or a set of fibers.

6. The transmission belt according to claim 2, wherein the elastomer-based body is made of a material chosen from ethylene-propylene-diene monomer, ethylene-propylene copolymer, polybutadiene, polyurethane or natural rubber.

7. The transmission belt according to claim 1, wherein the set of tension cords defines a tensile modulus of the transmission belt of between 500 N and 1500 N.

8. The transmission belt according to claim 1, wherein the cords of the set of cords are made of a polyamide- or polyester-based material.

9. The transmission belt according to claim 1, wherein the coating, partially embedded in the toothing, is chosen from a knitted fabric, a woven fabric, a non-woven fabric or a set of fibers.

10. The transmission belt according to claim 9, wherein the coating is made of a material chosen from polyamide, polyester, cellulose fibers, for example cotton, a mixture of cellulose fibers and polyurethane or a combination thereof.

11. The transmission belt according to claim 1, wherein the elastomer-based body is made of a material chosen from ethylene-propylene-diene monomer, ethylene-propylene copolymer, polybutadiene, polyurethane or natural rubber.

12. The transmission belt according to claim 1, wherein the elastomer-based body is made of a material chosen from ethylene-propylene-diene monomer or ethylene-propylene copolymer, and the coating is a film of thermoplastic material which is at least partly cross-linked, comprising at least 30% polyethylene, the film covering the outer surface of the toothing.

13. The transmission belt of claim 12, wherein the film comprises particles and/or fibers of graphite, molybdenum disulphide and/or polytetrafluoroethylene.

14. A conveyor comprising a plurality of rollers with concave grooves made of steel or plastic, wherein the rollers are connected together in pairs by the transmission belt according to claim 1, so that the coating of the transmission belt is in contact with the bottoms of the concave grooves of the rollers.

15. The conveyor according to claim 14, wherein the transmission belt has a height (H) strictly less than a depth (PR) of the concave groove receiving it.

16. The conveyor according to claim 15, wherein the transmission belt is installed between the rollers with a laying tension of between 60 N/strand and 100 N/strand.

17. The conveyor according to claim 15, wherein the concave grooves of the rollers are made of a plastic material chosen from a polyamide, a polypropylene or a composite material based on fibers embedded in a thermoplastic or thermosetting resin.

18. The conveyor according to claim 14, wherein the concave grooves of the rollers are made of a plastic material chosen from a polyamide, a polypropylene or a composite material based on fibers embedded in a thermoplastic or thermosetting resin.

19. The conveyor according to claim 18, wherein the transmission belt is installed between the rollers with a laying tension of between 60 N/strand and 100 N/strand.

20. The conveyor according to claim 14, wherein the transmission belt is installed between the rollers with a laying tension of between 60 N/strand and 100 N/strand.

* * * * *